(No Model.) 2 Sheets—Sheet 1.
J. G. DIXON.
COLLAR AND CUFF DRIER AND DAMPENER.
No. 382,800. Patented May 15, 1888.
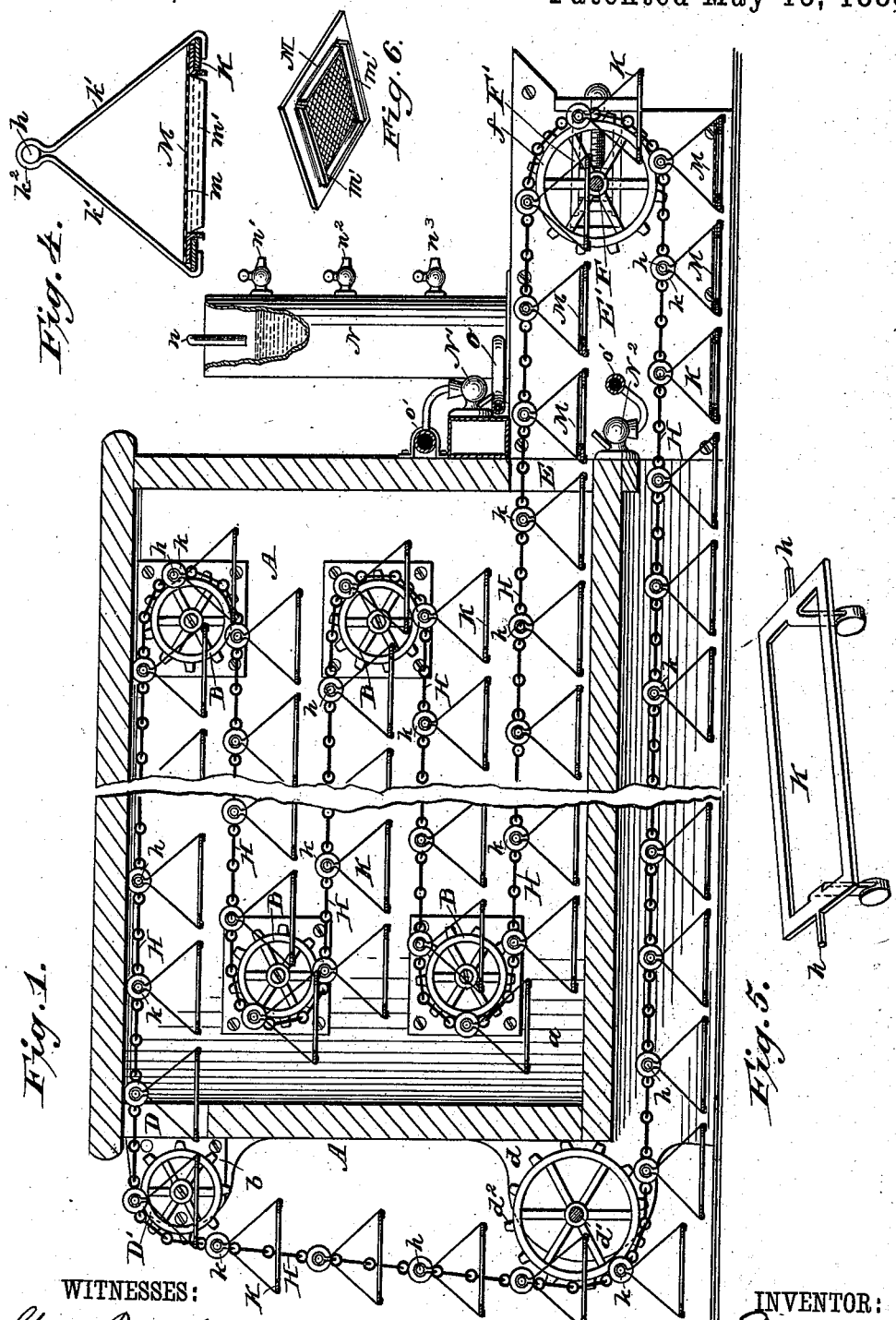
WITNESSES:
George Brinkenburg
C. Sedgwick.
INVENTOR:
J. G. Dixon
BY Munn & Co
ATTORNEYS.

(No Model.) 2 Sheets—Sheet 2.

J. G. DIXON.
COLLAR AND CUFF DRIER AND DAMPENER.

No. 382,800. Patented May 15, 1888.

WITNESSES:
George Binkenburg
C. Sedgwick

INVENTOR:
J. G. Dixon
BY Munn & Co.
ATTORNEYS.

UNITED STATES PATENT OFFICE.

JOHN G. DIXON, OF NEW YORK, N. Y.

COLLAR AND CUFF DRIER AND DAMPENER.

SPECIFICATION forming part of Letters Patent No. 382,800, dated May 15, 1888.

Application filed February 15, 1887. Serial No. 227,679. (No model.)

*To all whom it may concern:*

Be it known that I, JOHN G. DIXON, of the city, county, and State of New York, have invented a new and Improved Collar and Cuff Drier and Dampener, of which the following is a full, clear, and exact description.

My invention relates to an improvement in machines for drying and dampening collars and cuffs prior to being ironed, and has for its object to provide a means whereby collars and cuffs may be carried in quantities through a suitable heated chamber and be subject to exposure equally upon both sides, and wherein the said collars and cuffs after passing from the drying-chamber will be automatically sprinkled equally upon both sides and may be delivered from the machine prepared to be ironed.

The invention consists in the construction and combination of the various parts, as will be hereinafter fully set forth, and pointed out in the claims.

Reference is to be had to the accompanying drawings, forming a part of this specification, in which similar letters of reference indicate corresponding parts in all the figures.

Figure 3:
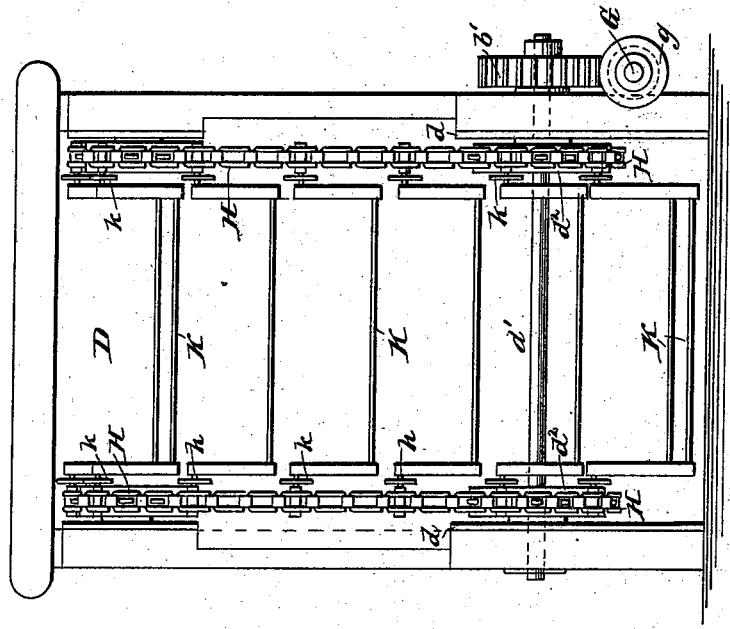
Figure 2:
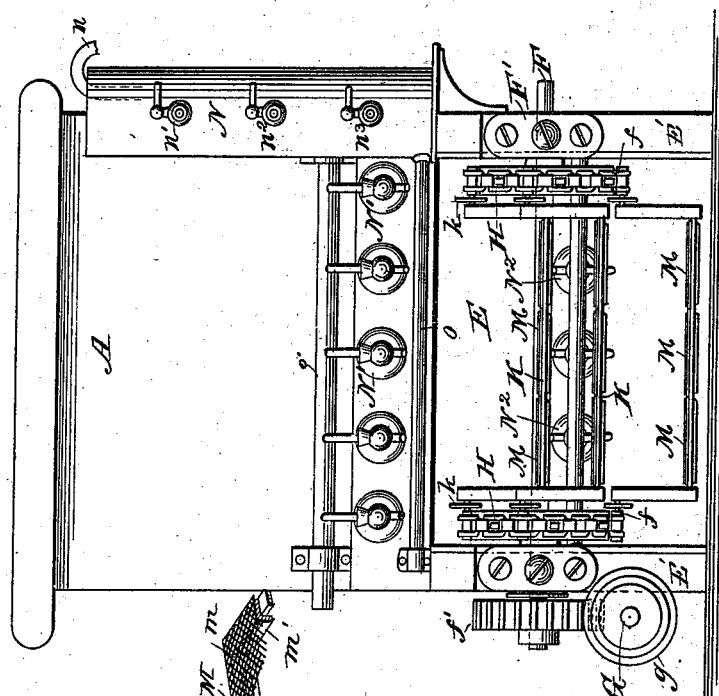
Figure 7:
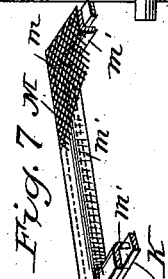

Figure 1 is a central vertical longitudinal section through the machine, the heating-chamber being centrally broken away; and Fig. 2 is a front end view thereof. Fig. 3 is a rear end view of the machine, and Fig. 4 a transverse section through a carrier. Fig. 5 is a perspective view of a modified form of carrier. Fig. 6 is a perspective view of one of the trays. Fig. 7 is a detail sectional perspective view.

Referring to the accompanying drawings, A represents a chamber of any desired size, heated by steam-pipes, a hot-air furnace, or equivalent means, in which chamber, near the ends and to the sides thereof, two or more sprocket-wheels, B, are journaled, the said sprocket-wheels upon opposite sides at the ends being arranged in transverse alignment; but the said wheels at the ends upon the same side are so placed that the top of the wheels B at the forward end will be in longitudinal alignment with the bottom of the wheels at the rear end, as shown in Fig. 1.

Near the top of the heated chamber A, at the forward end, a transverse slot, D, is made, and upon the outside bracket, $b$, forming a continuation of the side, at the top, sprocket-wheels D' are journaled, the top of which sprocket-wheels are in longitudinal alignment with the top of the upper sprocket-wheels, B, in the rear end of the heated chamber.

At the base of the heated chamber A, which is supported a distance above the floor, brackets $d$ are provided at the rear end, similar to the aforesaid brackets $b$, and in said brackets $d$ a transverse shaft, $d'$, is journaled, having keyed thereto within the brackets sprocket-wheels $d^2$, and upon one end outside the bracket worm-gear $b'$, as shown in Fig. 3.

At the bottom of the heating-chamber, transversely the rear end, a slot, E, is provided, of similar size to the slot D in the upper portion of the front, and the sides of the said chamber are continued rearward a distance in alignment with the top of the lower transverse slot, E, and from thence downward to the floor, forming thereby the rear extensions, E'. (Shown in Figs. 1 and 2.)

The space between the bottom of the heating-chamber A and the floor, also between the sides of the chamber-supports and the space intervening the extensions E', is preferably left open, for a purpose hereinafter stated.

About centrally the rear side extensions, E', and near the end, a transverse shaft, F, is journaled in adjustable bearings F', which shaft is in longitudinal alignment with the shaft $d'$ in the front. Upon the transverse shaft F, within the extensions and near thereto, sprocket-wheels $f$ are keyed, and upon one end, outside the bearings, a worm-gear, $f'$, is secured, corresponding with and upon the same side as the aforesaid worm-gear $b'$. Longitudinally the heating-chamber a drive-shaft, G, is supported in proper bearings, carrying worms $g$ near each end, adapted to mesh with the worm-gear $b'$ and $f$, and communicate motion thereby to the transverse shafts $d'$ and F.

Two endless chain belts, H, one at each side of the machine, are made to pass over the sprocket-wheels D' into the heated chamber A through the upper transverse slot, D, from thence in parallel lines over the sprocket-wheels B in said chamber, and out therefrom through the lower transverse slot, E, over the adjustable sprocket-wheels $f$ beneath the floor of the heating-chamber and over the sprocket-wheels $d^2$. The endless chain belts may be stretched to any degree of tension by means of the adjustable sprocket-wheels $f$ at the rear of the machine.

The links of the chain constituting the endless belt H are fitted with bearings at regular intervals apart, in which the trunnions $h$ of swinging frames or open shelves K are journaled, each trunnion of the said frame, which for convenience I call "carrier," being provided with a suitable washer, $k$, as shown in Fig. 1. The shelves or carriers may be suspended on a level with the supporting-chains, and be provided with counterpoise-weights, as shown in Fig. 5, but are preferably suspended beneath the side supporting-chains, as illustrated in the other figures.

The carriers K are preferably made rectangular in shape, with a yoke, $k'$, attached to the side edges at the ends, extending over said ends at the top of the frame, the said yokes presenting in appearance a triangle, the apex being formed into a ring, $k^2$, in which ring the trunnions $h$ are secured. The carriers are kept in a horizontal position through all the turnings of the supporting-chain by their own gravity.

Upon the carriers a series of trays, M, are adapted to be placed, which trays consist of a rectangular frame of a width about equal to the width of the carriers, which frames are covered with a perforated material, $m$, preferably gauze, and are prevented from slipping from the carrier by flanges $m'$, projecting from the under side of the trays, or other appropriate devices, and may be made to hold any desired number of collars or cuffs.

To the rear of the machine a water-tank, N, is supported upon one rear extension, E', supplied with water by means of pipe $n$, which is adapted to furnish only a small quantity of water more than required. The tank N is provided with a series of overflow-cocks, $n'$, $n^2$, and $n^3$, arranged in the same vertical plane at regular intervals longitudinally the tank, as shown in Figs. 1 and 2.

A row of atomizers, N' N², are secured in a horizontal plane to the rear of the heated chamber A above and below the aperture E therein, the said atomizers being arranged at equidistance apart, as shown in Fig. 2. Immediately below the upper tier of atomizers and above the lower tier pipes $o$ are held, which pipes are provided with a minute aperture opposite each atomizer, and are supplied with water from the tank N. Compressed air is furnished the atomizers through the pipes $o'$, so that a constant spray is automatically caused to play at the top and bottom of the collars and cuffs upon the gauze trays as they pass between the atomizers.

If the cocks $n^2$ and $n^3$ are kept closed and the cock $n'$ open, the height of water in the tank will be maintained at the highest level or even with the open cock, as shown in Fig. 1, and a pressure will be exerted upon the pipes $o$ in accordance with the height of said cock above the said pipes. If a less pressure and smaller volume of water, and consequent lighter spray, is required, the cock $n^2$ is opened and the water will sink to that level, and if still less pressure is desirable the last cock, $n^3$, may be opened.

The aforesaid cocks $n'$, $n^2$, and $n^3$ may be connected with any convenient waste-pipe, and any height of reservoir may be employed, and any desired number of overflow-cocks be used.

In operation the collars and cuffs, having been starched, are spread singly upon the trays or screens of gauze, which trays are thereupon placed upon the carriers at the front of the machine. The chain-belts are thereupon made to traverse the heated chamber at an equal rate of speed and carry the collars and cuffs slowly through said chamber, from whence they emerge dry at the transverse slot E in the rear of the machine. From thence they pass between the jets of spray from the atomizer, which properly dampens them on both sides for ironing.

Having thus described my invention, what I claim as new, and desire to secure by Letters Patent, is—

1. In a machine for drying and dampening collars and cuffs, the combination, with a heated chamber, of an endless chain traveling in and out of the chamber, carriers suspended from the endless chain, and atomizers arranged outside of the chamber and above and below the endless chain, substantially as herein shown and described.

2. In a machine for drying and dampening collars and cuffs, the combination, with a heated chamber, A, having the extension E' and provided with an inlet, D, and outlet E, a series of atomizers attached above and below the said outlet, and endless chain belts H, traversing said chamber, of carriers K, journaled in and suspended from said chain, and perforated trays M, supported upon said carriers, adapted to hold collars and cuffs, substantially as shown and described, whereby the collars and cuffs in said trays have both surfaces presented equally to the heat and also to the spray of the atomizers, as set forth.

3. In a machine for drying and dampening collars and cuffs, the combination, with a heated chamber, A, having an inlet, D, and outlet E, and provided with the extension E', endless chain belts H, traversing said chamber, carriers K, journaled in said chain and supported therefrom in a horizontal position, and perforated trays supported by said carriers adapted to hold collars and cuffs, of a series of atomizers, N' N², held above and below said outlet, and a tank, N, adapted to supply water to said atomizers, provided with overflow-cocks $n'$, $n^2$, and $n^3$, substantially as shown and described, whereby the spray is regulated, to be thrown upon the collars and cuffs after passing through the outlet E, as set forth.

JOHN G. DIXON.

Witnesses:
J. F. ACKER, Jr.,
E. M. CLARK.